United States Patent
Johnson et al.

(10) Patent No.: US 8,169,616 B2
(45) Date of Patent: May 1, 2012

(54) INTERFEROMETER STEP SCANNING SYSTEMS AND METHODS

(75) Inventors: David B. Johnson, Needham, MA (US); Anthony Bond, Lysterfield (AU)

(73) Assignee: Agilent Technologies Australia (M) Pty Ltd, Forest Hill (AU)

( * ) Notice: Subject to any disclaimer, the term of this patent is extended or adjusted under 35 U.S.C. 154(b) by 258 days.

(21) Appl. No.: 12/658,902

(22) Filed: Feb. 16, 2010

(65) Prior Publication Data

US 2011/0199614 A1   Aug. 18, 2011

(51) Int. Cl.
    *G01B 9/02* (2006.01)
(52) U.S. Cl. ...................................................... 356/452
(58) Field of Classification Search .................. 356/451, 356/452; 250/339.07, 339.08
    See application file for complete search history.

(56) References Cited

U.S. PATENT DOCUMENTS

| | | | |
|---|---|---|---|
| 5,166,749 A | | 11/1992 | Curbelo et al. |
| 5,657,122 A | * | 8/1997 | Curbelo et al. ............... 356/452 |
| 6,025,913 A | | 2/2000 | Curbelo |
| 6,462,823 B1 | | 10/2002 | Braun et al. |

OTHER PUBLICATIONS

Christopher J. Manning, "Instrumentation for Step-scan FT-IR Modulation Spectrometry", In: Handbook of Vibrational Spectroscopy, Dec. 20, 2001, John Wiley & Sons, vol. 1, pp. 1-15.
Tatsuhiko Nakano et al., "One- and Two-Dimesional Infrared Time-Resolved Spectrocopy Using a Step-Scan FT-IR Spectrometer: Application to the Study of Liquid Crystal Reorientation Dynamics", Applied Spectroscopy, The Society for Applied Spectroscopy, vol. 47, No. 9, Sep. 1, 1993, pp. 1354-1366.
R. A. Palmer et al., "Investigation of Time-Dependent Phenomena by Use of Step-Scan FT-IR", Applied Spectroscopy, vol. 47, No. 9, 1993, pp. 1297-1310.
C. Rodig et al., "Errors and Artifacts in Time-Resolved Step-Scan FT-IR Spectroscopy", Applied Spectroscopy, The Society for Applied Spectroscopy, vol. 53, No. 8, Aug. 1, 1999, pp. 893-901.
European Search Report dated Jun. 27, 2011 from Application No. EP11150446.

* cited by examiner

*Primary Examiner* — Samuel A Turner

(57) ABSTRACT

In some embodiments, the pathlength difference (retardation) in a step scanning infrared (IR) spectrometer interferometer is maintained under AC servomechanism (servo) control for a first period following a step change, and under DC servo control for a second period following the first period. Data is acquired during and/or after the DC servo control period. Switching off the AC servo control prior to data acquisition allows limiting the dither-frequency noise that could otherwise affect signals of interest, particularly in fast-time-scale applications such as high-speed time-resolved spectroscopy (TSR). A mirror position control circuit controls a mirror position stepping as well as switching a mirror servo control from AC to DC.

12 Claims, 4 Drawing Sheets

INTERFEROMETER STEP SCANNING SYSTEMS AND METHODS

BACKGROUND OF THE INVENTION

The invention relates to interferometers, and in particular to servo control systems and methods for controlling an optical path difference in a step scanning spectrometer interferometer.

A Fourier transform spectrometer typically includes an interferometer used to generate an interference between reflected portions of a monochromatic reference beam (e.g. a laser beam), and an interference between reflected portions of a broadband infrared beam of interest. The interferometer may include one or more movable mirrors, whose positions are used to control optical pathlengths through the interferometer. In rapid scanning, a pathlength difference (retardation) between the interfering beam portions is increased at a constant velocity over an interval of interest as data is acquired. In step scanning, the retardation is changed in steps, and data is acquired at each step. The retardation can be altered by moving one or more optical elements such as mirrors.

A step scanning interferometer can use dither to generate small cyclic changes in the path difference between a linearly-movable mirror and a mirror attached to an actuator such a piezoelectric transducer (PZT). The dither modulates both the monochromatic reference beam and the broadband infrared beam. The monochromatic light beam can be used as a reference to accurately servo control the average path difference between the two mirrors. In one approach, the modulated monochromatic beam from the interferometer is directed to a detector whose output is AC coupled. A demodulator operating at twice the dither frequency is used to detect a second harmonic of the dither signal and is applied as the error input of a servo that adjusts the time-averaged path difference between the moving mirror and fixed mirror to a zero crossing of the monochromatic light. The application of dither and AC coupling reduce the dependence of system properties on drift caused by time variations in monochromatic light source intensity, beam splitter efficiency, and detector sensitivity.

Commonly used interferometers may perform suboptimally in some IR spectroscopy applications, such as time-resolved spectroscopy (TRS).

SUMMARY OF THE INVENTION

According to one aspect, a method comprises stepping an optical pathlength difference in a step scanning interferometer from a first value to a second value; enabling an interferometer mirror dither under AC servo control for a first time interval to stabilize the pathlength difference at the second step value; for a second time interval subsequent to the first time interval, disabling the mirror dither under AC servo control and enabling an interferometer mirror position DC servo control; and enabling an interferometer data collection while the mirror dither under AC servo control is disabled.

According to another aspect, an apparatus comprises at least one actuator configured to step an optical pathlength difference in a step scanning interferometer from a first value to a second value, and a system controller connected to the at least one actuator. The system controller is configured to enable an interferometer mirror dither under AC servo control for a first time interval to stabilize the pathlength difference at the second step value, disable the mirror dither under AC servo control and enable an interferometer mirror position DC servo control for a second time interval subsequent to the first time interval, and enable an interferometer data collection while the mirror dither under AC servo control is disabled.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, a set of elements includes one or more elements. A plurality of elements includes two or more elements. Any reference to an element is understood to encompass one or more elements. Each recited element or structure can be formed by or be part of a monolithic structure, or be formed from multiple distinct structures. Unless otherwise stated, any recited electrical or mechanical connections can be direct connections or indirect operative connections through intermediary structures. The statement that two events occur synchronously means that the two events occur on the same clock cycle. Unless otherwise specified, the term "logic" encompasses special-purpose hardware (e.g. part of an application-specific integrated circuit, ASIC), as well as programmable logic (e.g. part of a field-programmable gate array, FPGA, programmable digital-signal processor, DSP, or other programmable processor such as a microcontroller).

The following description illustrates embodiments of the invention by way of example and not necessarily by way of limitation.

Figure 1:
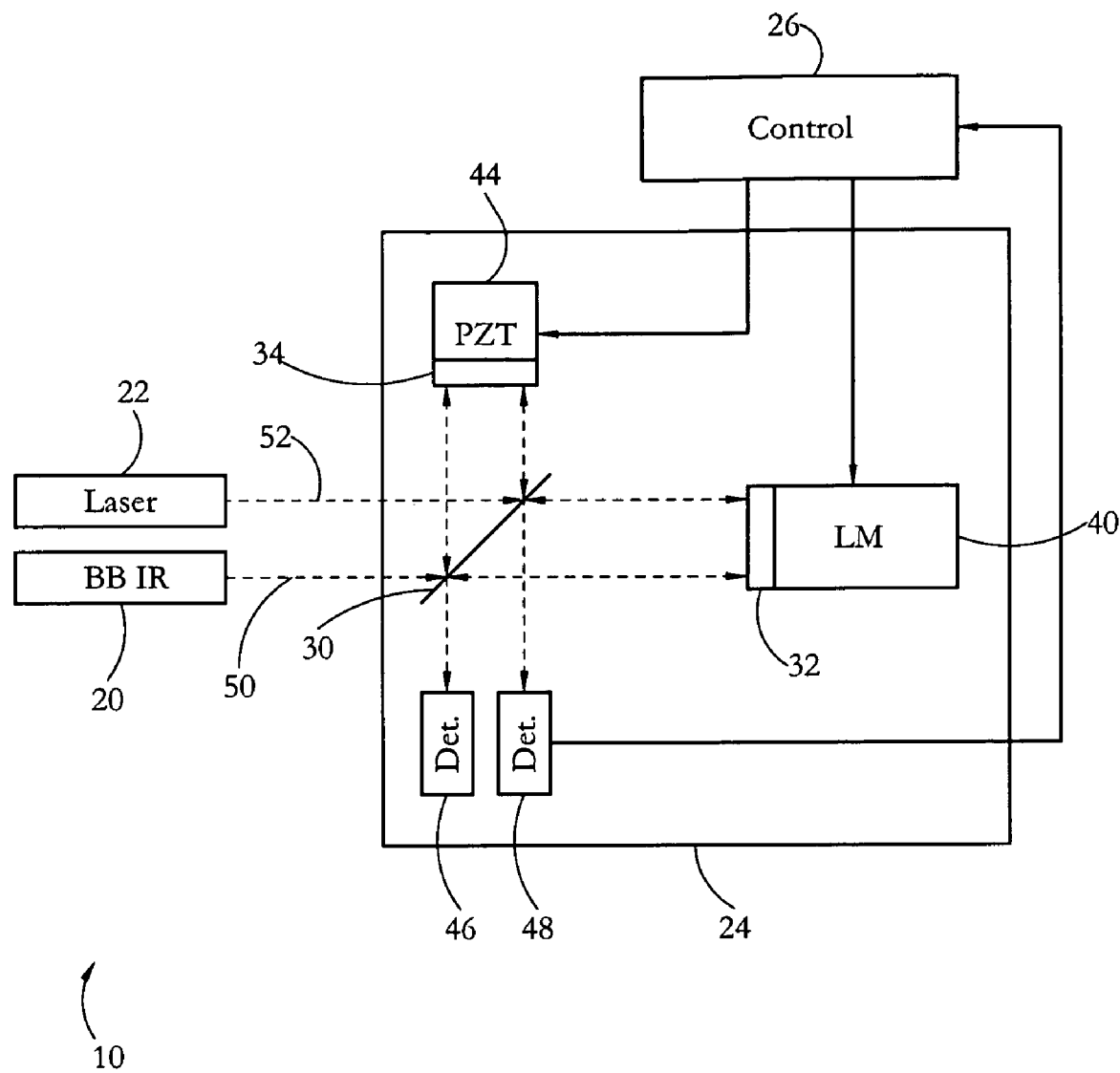
FIG. 1 shows an exemplary step scanning spectrometer interferometer according to some embodiments of the present invention.

FIG. 1 shows an exemplary step scanning spectrometer interferometer system 10 according to some embodiments of the present invention. Interferometer system 10 includes broadband infrared light source 20, a monochromatic reference light source such as a laser 22, an interferometer 24 optically coupled to broadband infrared light source 20 and laser 22, and a controller 26 electrically coupled to interferometer 24. The exemplary interferometer shown in FIG. 1 is a 90° Michelson interferometer; systems and methods as described below may be used with other interferometer configurations. Interferometer 24 includes a beam splitter 30, two movable, transversely-oriented (e.g. mutually-perpendicular) planar mirrors 32, 34 optically coupled to beam splitter 30, and infrared and reference optical detectors 46, 48, respectively, optically coupled to beam splitter 30. Mirror 32 is linearly movable along a direction perpendicular to its reflective surface. The position and orientation of mirror 34 are adjustable along two axes of rotation to allow controlling the relative angle(s) between mirrors 32, 34, and one translation direction along the optical path. Mirror 32 is mechanically coupled to a linear motor (LM) 40, which controls the linear motion (translation) of mirror 32. Mirror 34 is mechanically coupled to a 3-element piezoelectric transducer (PZT) 44, which controls the orientation and distance of mirror 34 relative to mirror 32, and allows dithering mirror 34. In some embodiments, the three elements of PZT 44 are equally-spaced apart in a triangular pattern along the back surface of mirror 34. Translation is achieved by driving all three PZT elements equally, while a change in mirror orientation is achieved by driving the three PZT elements unequally (e.g. by driving one or two elements according to the desired angle change). Dither may be achieved by applying a sinusoidal drive signal equally to all three PZT elements. Controller 26 is electrically connected to LM 40, PZT 44, and detector 48. Controller 26 controls the operation of LM 40 and PZT 44 in response to signals received from detector 48 as described below.

Broadband infrared light source 20 outputs a broadband infrared beam 50 encoding spectroscopic information of interest, while laser 22 generates a monochromatic reference beam 52. Beams 50, 52 are incident on beam splitter 30. For each beam 50, 52, beam splitter 30 splits the incident light and directs one part toward mirror 32 and another part toward mirror 34. Light reflected by mirrors 32, 34 returns and passes through beam splitter 30 and is detected by detectors 46, 48. Due to interference between light traveling along the two optical paths, the intensity of light detected by each detector 46, 48 depends on the positions of mirrors 32, 34, which determine the pathlength difference (retardation) between the optical paths of the interfering portions of each beam.

Monochromatic reference beam 52 is used to accurately servo control the interferometer retardation, which can be achieved by controlling the linear position of mirror 32. In some embodiments, both mirrors 32, 34 may be moved linearly along the local optical path at each mirror. For simplicity, the following description focuses on a system in which only mirror 32 is moved linearly between retardation steps, while mirror 34 is dithered.

To perform measurements, the position of mirror 32 is stepped between multiple positions, wherein each position corresponds to a zero-crossing of the monochromatic light at detector 48. Following each linear translation step, mirror 34 is dithered under AC servo control for a first period to stabilize the mirror position to the zero-crossing. The dither is then turned off, and the position of mirror 34 is maintained under DC servo control. The IR data of interest is collected while the dither is turned off and mirror 34 is under DC servo control. Collecting data while the dither is turned off allows reducing artifacts introduced by the dither into the detected signal. Reducing such artifacts is of particular interest for high-speed applications such as time-resolved spectroscopy. At the same time, position retardation is maintained through the use of DC servo control over the data acquisition interval.

In some embodiments, provision is made to adjust the angle of mirror 34 in order to compensate for tilting of mirror 32. In such embodiments, detector 48 may include a triangular array of three detector units, and PZT 44 may include a corresponding array of three PZT actuators. An expanded beam from laser 22 passes through interferometer 24 and is incident on the three detector units. Controller 26 may include phase detection circuitry connected to the three detector units, configured to measure phase differences between the three detector units to generate electrical signals to drive the three PZT actuators and mirror 34 to an angular orientation to maintain a fixed phase relationship between the detector signals and thus compensate for variations in tilt to the mirror 32. Stabilizing the angle(s) between mirrors 32, 34 using such a multi-axis scheme is known in the art, and can be performed in embodiments of the present invention during both the AC and DC servo time intervals described above. For clarity, the description below focuses on a single detector for measuring retardation accuracy and a single PZT (which may include 3 coordinated PZT actuators) to adjust the retardation.

Figure 2:
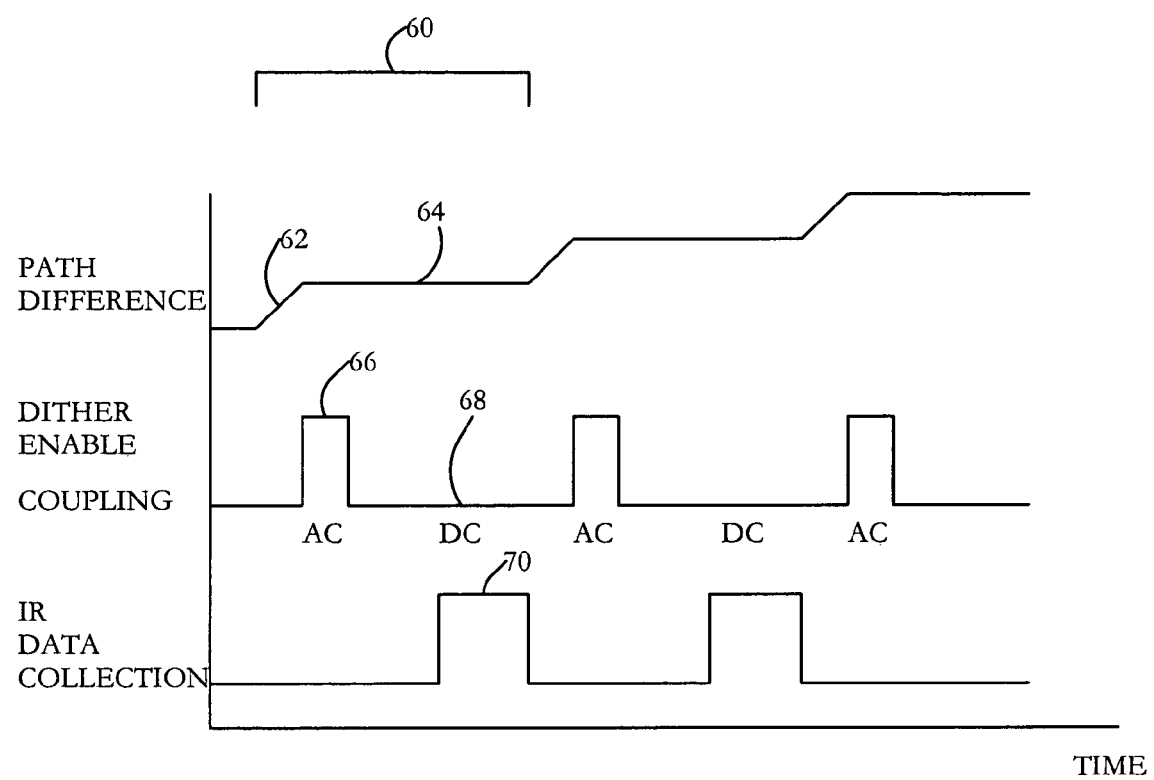
FIG. 2 shows a time-dependence of an interferometer optical path difference (retardation), dither source signal, and infrared (IR) data collection signal according to some embodiments of the present invention.

FIG. 2 shows a time-dependence of an interferometer optical path difference (retardation), dither source signal, and infrared (IR) data collection signal according to some embodiments of the present invention. Consider a step time interval 60 corresponding generally to a retardation point. The path difference is ramped up by moving mirror 32 to a desired position during a ramp interval 62. In some embodiments, ramp interval 62 may have a duration on the order of tens of microseconds (µs). The pathlength at the end of the ramp interval corresponds generally to a zero crossing of the monochromatic light. During the ramp interval, servo control is turned off. The average mirror position is then held fixed during a plateau interval 64, using AC servo control for an AC servo period 66, and using DC servo control during a DC servo period 68 immediately following the first period. Dither is enabled during the AC servo period 66. The dither frequency may be on the order of kHz to tens of kHz, for example about 10 kHz to 20 kHz, more particularly about 16 kHz. The second harmonic used for AC servo control is double the dither frequency. AC servo may be maintained until the servo settles, which may take on the order of 1 ms to 10 ms. For simplicity, the pathlength difference illustration in FIG. 2 does not show dithering during the AC servo period. The dither is turned off during the DC servo period 68. After an interval sufficient to allow transients to settle, for example about 1 ms to several ms, IR data is acquired during a data collection interval 70. The duration of data collection interval 70 may range from on the order of several nanoseconds (ns), e.g. about 5 ns, for applications such as high-speed time-resolved spectroscopy, to on the order of ms or seconds for other applications. When the data acquisition is complete for the current retardation value, the pathlength is ramped up to the next retardation value, dither is enabled, and the cycle described above is repeated.

Figure 3:
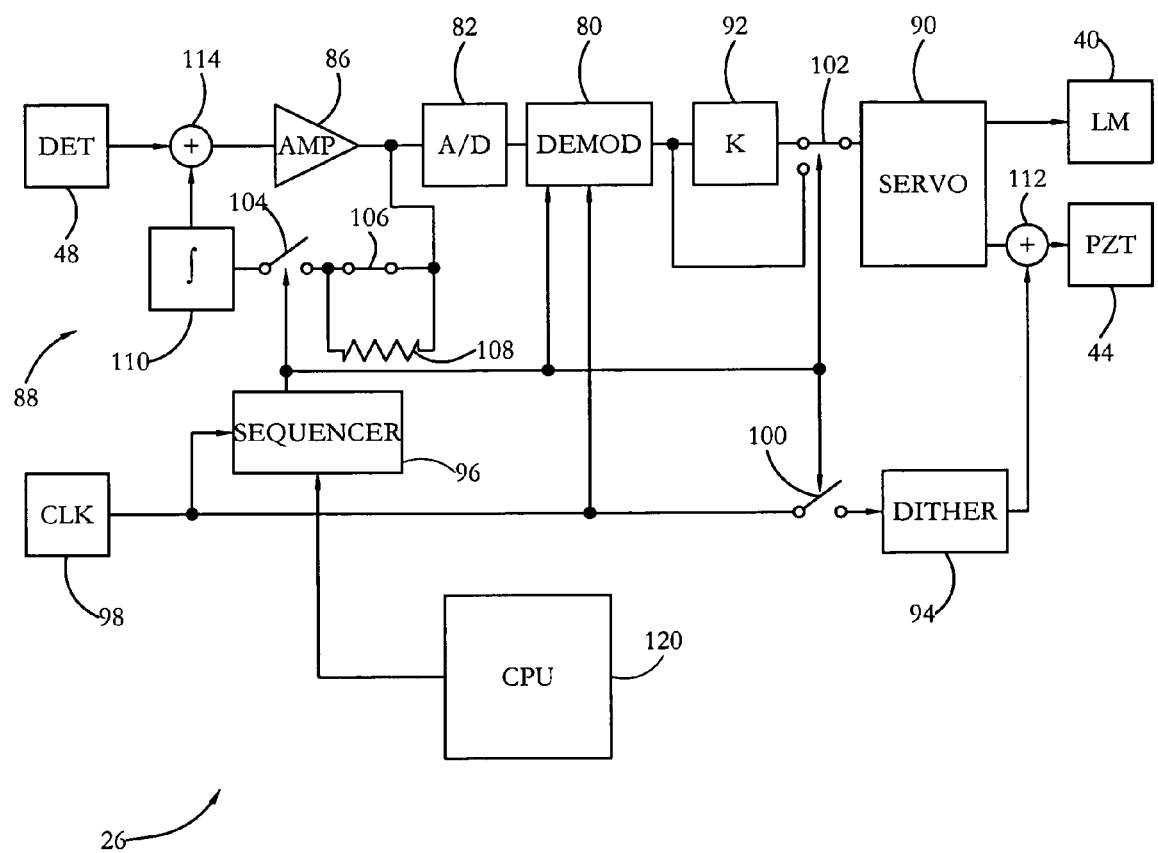
FIG. 3 shows an interferometer controller according to some embodiments of the present invention.

The pathlength difference control operations described above are performed by controller 26 (FIG. 1) using feedback data received from detector 48. FIG. 3 shows the structure of controller 26 according to some embodiments of the present invention. The circuit of FIG. 3 is capable of transferring from AC to DC coupling synchronously with turning off dither, as described below. The circuit of FIG. 3 also maintains the nominal value of its output signal at mid-range upon a switch from AC to DC coupling. Controller 26 includes a demodulator 80 having an input connected to detector 48 through an analog-to-digital (A/D) converter 82, an amplifier 86, and a high-pass filter 88. In some embodiments high-pass filter 88 is implemented by DC feedback (as distinct from DC blocking). An output of demodulator 80 is connected to an input of a servo controller 90 directly or alternatively through a gain (attenuation) stage 92, as determined by the position of a gain control switch 102. In the embodiment illustrated in FIG. 3, demodulator 80, gain stage 92 and servo controller 90 are implemented using digital hardware (logic) and/or software configured to perform the operations described below. In embodiments in which an A/D converter is not used before the servo controller, corresponding analog circuits may be used instead of digital components for exemplary units such as demodulator 80, gain stage 92 and servo controller 90, among others.

Gain stage 92 introduces a signal gain (multiplication factor) K. Gain stage 92 compensates for differences in loop gain between AC and DC servo modes caused by different operations performed by demodulator 80 in the two modes, as described below. A suitable K value may be determined according to the magnitude of the applied dither and/or the error signal sensitivity to position error. In some embodiments 0<K<1, more particularly 0.01<K<0.1, specifically 0.04<K<0.05, e.g. K=0.043. For example, in some embodiments in which position error signals are determined as described below with reference to FIG. 5 (i.e. a position error signal set by demodulator 80 to be proportional to the −A+B−C+D area during AC servo operation and +A+B+C+D area during DC servo operation), and for a dither of ±π/6 radians and an exemplary position error of 0.2 radians, a K value of about 0.043 may yield similar-magnitude or substantially identical error signals transmitted to servo controller 90 for identical position errors during AC and DC servo operation.

Servo controller 90 may be implemented using dedicated special-purpose hardware and/or software running on a programmable processor. A linear motion output of servo controller 90 is connected to and controls the operation of LM 40. A second control output of servo controller 90 is combined through a summing block 112 with the output of a dither source (dither enable) circuit 94, and connected to PZT 44. PZT 44 may be connected to summing block 112 through one or more suitably-compensated amplifiers. Summing block 112 may include a linear summing amplifier. Summing block 112 may sum the currents of two or more input signals. An input of dither source circuit 94 is connected to a clock signal generator 98 through a switch 100. Dither source circuit 94 is capable of generating signals at the desired dither frequency (e.g. about 16 kHz), while clock signal generator 98 generates clock signals for demodulator 80 at the second harmonic of the dither frequency (e.g. about 32 kHz). A sequencer 96 receives clock signals from clock signal generator 98, and sends sequencing signals to a switch 104 of high-pass filter 88, to switch 100, gain control switch 102, and demodulator 80. Sequencer 96 changes the states of demodulator 80 and switches 100, 102, 104 between AC and DC coupling states. Switch 104 connects an input of an integrator 110 to the output of amplifier 86 through an AC coupling time-constant control stage comprising a time-constant control switch 106 connected in parallel to a resistor 108. The outputs of integrator 110 and detector 48 are connected to the input of amplifier 86 through a summing block 114. Summing block 114 may be implemented as described above for summing block 112. A general-purpose processor (CPU) 120 is connected to and controls the operation of sequencer 96 and switch 106. Switch 106 is open for rapid-scan operation to yield a first, relatively low cut-off frequency (e.g. about 5 Hz) for high-pass filter 88, and is closed for dithered AC-coupled step scan operation to yield a second, relatively high cut-off frequency (e.g. about 2 kHz) for high-pass filter 88.

The operation of controller 26 may be better understood by first considering in turn AC coupling and DC coupling states. The transitions between AC coupling and DC coupling states are controlled by sequencer 96 according to time periods determined according to clock signals received from clock signal generator 98. In an AC coupling state, dither source switch 100 is closed, and dither source circuit 94 filters and amplifies clock signals received over switch 100. Dither source circuit 94 generates a dither signal for controlling the cyclic motion of PZT 44. Switches 104 and 106 are also closed, and high-pass filter 88 is connected across amplifier 86. Demodulator 80 is set to an AC coupling state. Gain control switch 102 connects demodulator 80 directly to servo controller 90, bypassing gain stage 92. An analog signal generated by detector 48 is filtered by high-pass filter 88, amplified by amplifier 86, and digitized by A/D converter 82. The resulting digital signal is demodulated by demodulator 80, and any detected second harmonic of the dither signal is used as an input to servo controller 90. The output of demodulator 80 is approximately proportional to the position error over at least part of the position error range. Servo controller 90 generates a control signal which adjusts the central position of PZT 44 to reduce the received second harmonic indicator to nearly zero. Servo controller 90 also controls the position of LM 40. In some embodiments, the position of LM 40 may be controlled using coordinated dynamic feedback.

After a predetermined period of time has elapsed (see FIG. 2), sequencer 96 switches to a DC coupling state. Switch 100 is open, and dither source circuit 94 is off. Switch 104 is open, and high-pass filter 88 is disconnected. Demodulator 80 is set to a DC coupling state. Gain control switch 102 connects gain stage 92 to servo controller 90. A DC signal propagates through demodulator 80 and is used by servo controller 90 to apply a control signal to PZT 44. The DC servo control signal adjusts the path difference between LM 40 and PZT 44 to maintain a fixed output level for detector 48 corresponding to the zero-crossing or midpoint of detector 48.

Figure 4:
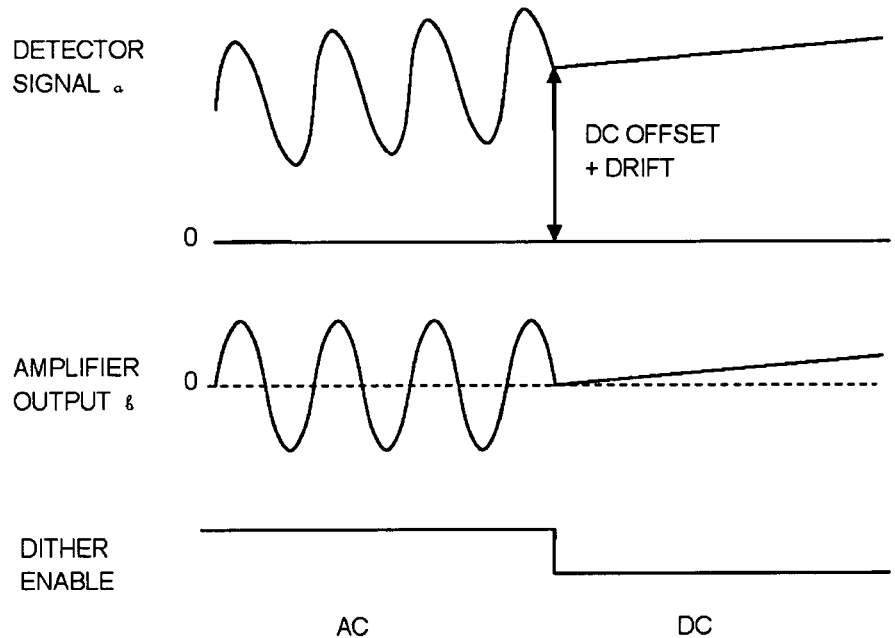
FIG. 4 shows a time-dependence of a detector signal and amplifier output in the presence of DC offset drift according to some embodiments of the present invention.

FIG. 4 shows a time-dependence of the outputs of detector 48 and amplifier 86 in the presence of DC offset drift over AC coupling and DC coupling intervals, according to some embodiments of the present invention. The magnitude of the DC drift is exaggerated in FIG. 4 for illustrative purposes. During the AC coupling interval, dither is turned on, and the output of detector 48 exhibits a generally-sinusoidal variation overlaid on a constant DC drift. During the subsequent DC coupling interval, the outputs of detector 48 and amplifier 86 become susceptible to drift in variables such as monochromatic light source intensity, beam splitter efficiency, and detector sensitivity. Such time variations occur on timescales on the order of second to minutes, and are generally slower than individual time periods spent in DC coupling mode, which are commonly on the order of milliseconds.

In some embodiments, dynamically changing the control loop parameters of controller 26 between AC and DC coupling may inject transients into the optical system and upset the accuracy of mirror positioning. In some embodiments, such transients are reduced by implementing a demodulator control method described below with reference to FIG. 5.

Figure 5:
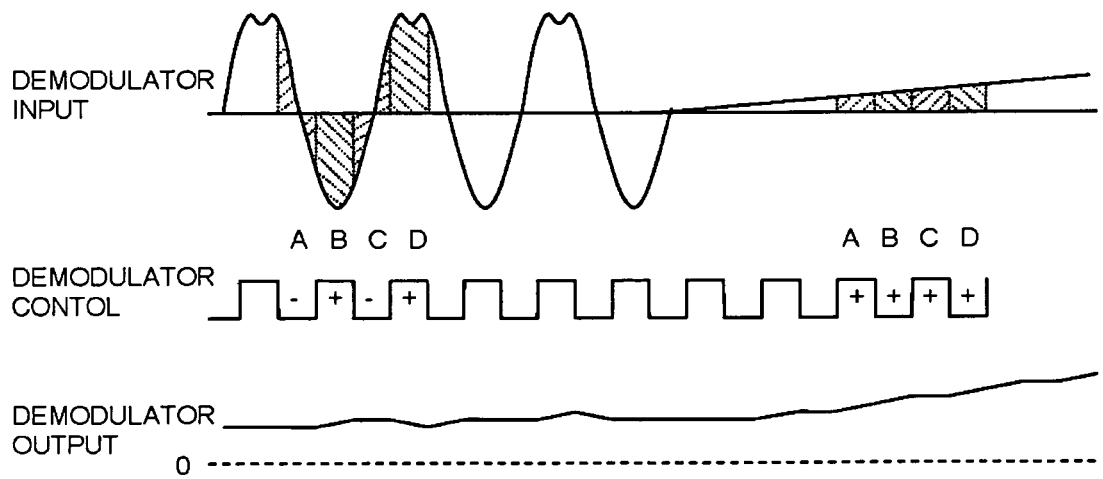
FIG. 5 shows a time-dependence of demodulator input, control and output signals according to some embodiments of the present invention.

FIG. 5 shows an exemplary time-dependence of input, control and output signals for demodulator 80 according to some embodiments of the present invention. The systems/methods illustrated in FIG. 5 allow reducing transients when switching from AC to DC servo control. The demodulator input received from A/D converter 82 (FIG. 3) exhibits a generally sinusoidal variation at the dither frequency overlaid with a second harmonic frequency modulation. The demodulator control signal generated by clock signal generator 98 (FIG. 3) is a square wave at the second harmonic of the dither frequency.

During AC coupling to generate a DC demodulator output proportional to the amount of the second harmonic of the dither frequency, demodulator 80 determines the area under the demodulator input curve shown in FIG. 5 for each time interval labeled A, B, C, D, and generates a position error signal by summing the corresponding areas for the time intervals as follows: −A+B−C+D, wherein A, B, C, D denote the hatched areas defined by the demodulator input waveform shown in FIG. 5. When the optical path difference is centered around a dither zero crossing, there is no second harmonic distortion to the dither-frequency demodulator output sine wave, and the output of demodulator 80 is zero. The area calculation may be performed approximately. For example, in some embodiments the conversion time of A/D converter 82 may limit the number of samples/readings used to calculate each area A/B/C/D, and thus the accuracy of the area-calculation. In an exemplary embodiment, about 5 ADC readings are used to calculate each area; such readings may be timed to cluster around peaks/troughs and zero crossings of the detector signal in order to improve the sensitivity of the position error measurement.

During DC coupling, dither is disabled and demodulator 80 and servo controller 90 may be configured to only sample (or pass) the detected signal generated by A/D converter 82. Demodulator 80 adds the demodulator input areas +A+B+C+D to generate a position error signal. The demodulator output is more sensitive to position error than during AC coupling, and the increase in loop gain can be compensated using gain stage 92 (FIG. 3) to maintain a desired servo loop transient behavior. The output scaling of the combined circuit formed by demodulator 80, gain stage 92 and switch 102 is the same in both AC and DC modes of operation, and the operation of servo controller 90 can remain unchanged during the two modes.

In some embodiments, a residual position error may be present at the time when the dither is turned off and controller 26 switches from AC to DC servo control. Residual offsets may be caused by inherent input offsets of electronic amplifier(s), and capacitive charge injection caused by switching on the input of integrator 110. A residual offset may appear on the output of amplifier 86 even with it is clamped by high-pass filter 88. Also, an offset may occur if dither is turned off at a time when the detector signal is not passing through a zero crossing. Such residual position errors may not be conveyed to the DC servo control circuitry if the DC is clamped to mid-scale by the AC coupling process. While repeatable position errors at each retardation step (e.g. a constant DC offset) may have a limited impact on the quality of analytical results, non-repetitive errors such as errors caused by transient vibrations could result in significant position error if not compensated when switching from AC to DC servo control.

In some embodiments, the last position error calculation made by demodulator 80 in AC servo control mode is used as a reference to the DC servo. Subsequently, the first measurement under the DC servo can be added to the servo reference input to compensate for an electronic offset. Consequently, the DC servo system will target an offset to achieve a desired interferometer path difference. In particular, if switching from AC to DC servo control is timed to coincide with a dither zero crossing, the output of high-pass filter 88 at the end of AC operation is approximately zero. The DC level is then zero even if some dither second harmonic is still present due to residual position error, since the presence of the second harmonic does not have significant effect on the relative timing of zero crossings. Such a presence of a second harmonic signal may be due to external influences such as vibration. When servo control switches to DC, a detector output value of zero indicates no position error, and thus, if the last position error calculation made by demodulator 80 in AC servo control mode were not used as a reference, servo 90 would not apply a position correction even if the retardation were not correct. When the last error calculation made by demodulator 80 in AC servo control mode is used as a reference (instead of the zero), the DC servo drives the retardation to a position that sets the output of demodulator 80 to be equal to the reference level.

For clarity, the description of an exemplary controller structure with reference to FIG. 3 focused on the reference (retardation control) channel of a step scanning interferometer controller. In some embodiments, an interferometer controller may include a reference (R) servo channel controlling the system retardation as described above, as well as angle-control (A, B) channels for controlling the relative angle(s) of mirrors 32, 34. In such a system, each angle-control channel may include a separate (dedicated) optical detector, high-pass filter, A/D converter, demodulator, servo controller and PZT element. Such angle-control channels may share with the reference channel connections to a number of components such as clock, CPU, dither source circuit, and sequencer. The sequencer controls the switching of each angle-control channel between AC and DC servo control as described above.

The systems and methods described above allow mitigating the effect of dither on the spectrometry data of interest, an effect which may be of particular concern in high-speed applications such as high-speed time-resolved spectroscopy, in which the dither frequency is not necessarily much higher than the range of infrared frequencies of interest and thus cannot be easily low-pass filtered. Dither is still used for an initial period of adjustment, but is then turned off to allow data acquisition in the absence of dither noise. Servo control is then switched to DC to hold the retardation position while the AC servo is off and data is acquired.

In some embodiments, step scanning interferometers can hold their retardation to sub-nanometer accuracy but are sensitive to disturbances. In particular, electrical transients from the servo system can inject energy into the PZT actuator(s) that can excite resonances in interferometer mechanical structures. Such resonances may result in additional modulations of the light sources, which can adversely affect analytical results. Such resonances may be beyond the bandwidth of the servo control system, and thus not capable of compensation by the servo. Such resonances may take time to naturally decay.

The method illustrated in FIG. 5 of switching the calculation performed by demodulator 80 and applying a selectable gain factor K to maintain a common input scaling for a single dual mode AC/DC servo controller allow reducing transients when switching from AC to DC servo control. A servo controller may have associated internal delays. For example, proportional-integral (PI) or proportional-integral-derivative (PID) controllers may include storage elements such as integrators that take time to reach a steady state. Using separate servo controllers for AC and DC servo control may lead to servo output transient behavior after switches between AC and DC servo control, as the servo storage elements charge and the servo controller reaches equilibrium. Using the same servo controller and input scaling for both the AC and DC servo control modes allows having servo internal storage element contents with the same or similar values for steady-state AC and DC operation, and thus reduced effects on servo output caused by switches between AC and DC servo control modes.

It will be clear to one skilled in the art that the above embodiments may be altered in many ways without departing from the scope of the invention. Accordingly, the scope of the invention should be determined by the following claims and their legal equivalents.

What is claimed is:
1. A method comprising:
   stepping an optical pathlength difference in a step scanning interferometer from a first value to a second value;
   enabling an interferometer mirror dither under AC servo control for a first time interval to stabilize the pathlength difference at the second step value;

for a second time interval subsequent to the first time interval, disabling the mirror dither under AC servo control and enabling an interferometer mirror position DC servo control; and performing an interferometer sample data collection while the mirror dither under AC servo control is disabled.

2. The method of claim 1, further comprising:

for the first time interval, setting an AC servo input signal to be proportional to −A+B−C+D, wherein A, B, C, and D represent time integrals of a pathlength difference optical detector signal over four equal and consecutive time intervals each equal to one fourth of a dither period; and for the second time interval, setting a DC servo input signal to be proportional to A'+B'+C'+D', wherein A', B', C', and D' represent time integrals of the pathlength difference optical detector signal over four equal and consecutive time intervals each equal to one fourth of the dither period.

3. The method of claim 2, further comprising:

during the first time interval, applying an AC servo input signal gain having a first value to the pathlength difference optical detector signal to generate an AC servo input signal; and during the second time interval, applying a DC servo input signal gain having a second value different from the first value to the pathlength difference optical detector signal to generate a DC servo input signal.

4. The method of claim 1, further comprising setting a last error position measured during the first time interval to be an initial position offset for the second time interval.

5. The method of claim 1, further comprising:

providing a pathlength difference optical detector signal as a servo input during the first time interval and the second time interval;

applying a high-pass filter to the pathlength difference optical detector signal for the first time interval; and not applying the high-pass filter to the pathlength difference optical detector signal for the second time interval.

6. The method of claim 1, further comprising:

controlling a position of a first interferometer mirror mounted on a linear motor to perform the stepping of the optical pathlength difference; and controlling a position of a second interferometer mirror mounted on a piezoelectric transducer to perform the interferometer mirror dither.

7. An apparatus comprising:

at least one actuator configured to step an optical pathlength difference in a step scanning interferometer from a first value to a second value; and a system controller connected to the at least one actuator and configured to enable an interferometer mirror dither under AC servo control for a first time interval to stabilize the pathlength difference at the second step value, for a second time interval subsequent to the first period, disable the mirror dither under AC servo control and enable an interferometer mirror position DC servo control, and perform an interferometer sample data collection while the mirror dither under AC servo control is disabled.

8. The apparatus of claim 7, wherein the system controller is further configured to:

for the first time interval, set an AC servo input signal to be proportional to −A+B−C+D, wherein A, B, C, and D represent time integrals of a pathlength difference optical detector signal over four equal and consecutive time intervals each equal to one fourth of a dither period; and for the second time interval, set a DC servo input signal to be proportional to A'+B'+C'+D', wherein A', B', C', and D' represent time integrals of the pathlength difference optical detector signal over four equal and consecutive time intervals each equal to one fourth of the dither period.

9. The apparatus of claim 8, wherein the system controller is further configured to:

during the first time interval, apply an AC servo input signal gain having a first value to the pathlength difference optical detector signal to generate an AC servo input signal; and during the second time interval, apply a DC servo input signal gain having a second value different from the first value to the pathlength difference optical detector signal to generate a DC servo input signal.

10. The apparatus of claim 7, wherein the system controller is further configured to set a last error position measured during the first time interval to be an initial position offset for the second time interval.

11. The apparatus of claim 7, wherein the system controller is further configured to:

provide a pathlength difference optical detector signal as a servo input during the first time interval and the second time interval;

apply a high-pass filter to the pathlength difference optical detector signal for the first time interval; and not apply the high-pass filter to the pathlength difference optical detector signal for the second time interval.

12. The apparatus of claim 7, wherein the system controller is further configured to:

control a position of a first interferometer mirror mounted on a linear motor to perform the stepping of the optical pathlength difference; and control a position of a second interferometer mirror mounted on a piezoelectric transducer to perform the interferometer mirror dither.

* * * * *